US012664683B2

(12) United States Patent     (10) Patent No.:   US 12,664,683 B2

Tremblay et al.     (45) Date of Patent:    Jun. 23, 2026

(54) TECHNIQUES FOR DIFFERENTIABLE DEEP OBJECT POSE ESTIMATION

(71) Applicant: NVIDIA CORPORATION, Santa Clara, CA (US)

(72) Inventors: Jonathan Tremblay, Redmond, WA (US); Stanley Birchfield, Sammamish, WA (US); Valts Blukis, Seattle, WA (US); Balakumar Sundaralingam, Seattle, WA (US); Stephen Tyree, University City, MO (US); Bowen Wen, Bellevue, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 143 days.

(21) Appl. No.: 18/608,804

(22) Filed: Mar. 18, 2024

(65) Prior Publication Data

US 2025/0104277 A1    Mar. 27, 2025

Related U.S. Application Data

(60) Provisional application No. 63/585,882, filed on Sep. 27, 2023.

(51) Int. Cl.
   G06T 7/73      (2017.01)
   G06T 15/00     (2011.01)
        (Continued)

(52) U.S. Cl.
   CPC ............... G06T 7/75 (2017.01); G06T 15/04 (2013.01); G06T 2207/10024 (2013.01); G06T 2207/10028 (2013.01); G06T 2207/20081 (2013.01)

(58) Field of Classification Search
   CPC ........... G06T 7/75; G06T 15/00; G06T 15/04; G06T 15/10; G06T 15/205; G06T 17/00;
            (Continued)

(56) References Cited

U.S. PATENT DOCUMENTS 11,615,506 B2 *   3/2023   Jung ..................... G06F 3/0346
                                          345/419
11,880,958 B2 *   1/2024   Jung ....................... G06F 3/011
                 (Continued)

OTHER PUBLICATIONS

Chen et al., "EasyHeC: Accurate and Automatic Hand-eye Calibration via Differentiable Rendering and Space Exploration", arXiv:2305. 01191, Nov. 7, 2023, 9 pages.

(Continued)

*Primary Examiner* — Vijay Shankar

(74) *Attorney, Agent, or Firm* — Artegis Law Group, LLP

(57) ABSTRACT

One embodiment of a method for determining object poses includes receiving first sensor data and second sensor data, where the first sensor data is associated with a first modality, and the second sensor data is associated with a second modality that is different from the first modality, and performing one or more iterative operations to determine a pose of an object based on one or more comparisons of (i) one or more renderings of a three-dimensional (3D) representation of the object in the first modality with the first sensor data, and (ii) one or more renderings of the 3D representation of the object in the second modality with the second sensor data.

20 Claims, 9 Drawing Sheets

(51) Int. Cl.
*G06T 15/04*          (2011.01)
*G06T 17/00*          (2006.01)
(58) Field of Classification Search
CPC ....... G06T 17/005; G06T 17/05; G06T 17/10;
G06T 17/20; G06T 2207/10024; G06T
2207/10028; G06T 2207/20081
See application file for complete search history.

(56)                References Cited

U.S. PATENT DOCUMENTS

| | | | | | |
|---|---|---|---|---|---|
| 11,931,909 | B2 * | 3/2024 | Tremblay | ............... | G06V 20/20 |
| 11,941,899 | B2 * | 3/2024 | Tremblay | ............... | G06V 10/82 |
| 12,165,256 | B2 * | 12/2024 | Wang | ...................... | G06V 10/82 |
| 12,175,623 | B2 * | 12/2024 | Jung | ......................... | G06T 3/40 |
| 12,293,535 | B2 * | 5/2025 | Kalra | .................... | G01B 11/245 |
| 2022/0375028 | A1 * | 11/2022 | Jung | ........................ | G06F 3/147 |

OTHER PUBLICATIONS

Blier et al., "Learning with Random Learning Rates", arXiv:1810.01322, Jan. 29, 2019, 19 pages.
Riba et al., "Kornia: an Open Source Differentiable Computer Vision Library for PyTorch", Winter Conference on Applications of Computer Vision, 2020, pp. 3674-3683.
Lee et al., "Camera-to-Robot Pose Estimation from a Single Image", arXiv:1911.09231, Apr. 23, 2020, 7 pages.
Abadi et al., "Large-Scale Machine Learning on Heterogeneous Distributed Systems", https://www.tensorflow.org/, Nov. 9, 2015, 19 pages.
Labbe et al., "MegaPose: 6D Pose Estimation of Novel Objects via Render & Compare", 6th Conference on Robot Learning, arXiv:2212.06870, Dec. 13, 2022, pp. 1-20.
Tyree et al., "6-DoF Pose Estimation of Household Objects for Robotic Manipulation: An Accessible Dataset and Benchmark", arXiv:2203.05701, Dec. 15, 2022, 11 pages.
Tremblay et al., "Deep Object Pose Estimation for Semantic Robotic Grasping of Household Objects", 2nd Conference on Robot Learning, arXiv:1809.10790, Sep. 27, 2018, pp. 1-11.
Lin et al., "Single-Stage Keypoint-Based Category-Level Object Pose Estimation from an RGB Image" arXiv:2109.06161, May 12, 2022, 8 pages.
Labbe et al., "CosyPose: Consistent multi-view Multi-object 6D Pose Estimation", arXiv:2008.08465, Aug. 19, 2020, pp. 1-41.
Liu et al., "Gen6D: Generalizable Model-Free 6-DoF Object Pose Estimation from RGB Images", arXiv:2204.10776, Jan. 27, 2023, pp. 1-32.
He et al., "OnePose++: Keypoint-Free One-Shot Object Pose Estimation without CAD Models", 36th Conference on Neural Information Processing Systems, 2022, pp. 1-13.
Pauwels et al., "SimTrack: A Simulation-based Framework for Scalable Real-time Object Pose Detection and Tracking", International Conference on Intelligent Robots and Systems, 2015, 9 pages.
Wen et al., "BundleSDF: Neural 6-DoF Tracking and 3D Reconstruction of Unknown Objects", CVPR, 2021, pp. 606-617.
Wen et al., "BundleTrack: 6D Pose Tracking for Novel Objects without Instance or Category-Level 3D Models", IEEE/RSJ International Conference on Intelligent Robots and Systems, arXiv:2108.00516, Aug. 1, 2021, 8 pages.
Tjaden et al., "Real-Time Monocular Segmentation and Pose Tracking of Multiple Objects", DOI: 10.1007/978-3-319-46493-0_26, Oct. 2016, 17 pages.
Tjaden et al., "Real-Time Monocular Pose Estimation of 3D Objects using Temporally Consistent Local Color Histograms", 2017, pp. 124-132.
Li et al., "DeepIM: Deep Iterative Matching for 6D Pose Estimation", 2018, pp. 1-16.
Wen et al., "se(3)-TrackNet: Data-driven 6D Pose Tracking by Calibrating Image Residuals in Synthetic Domains", International Conference on Intelligent Robots and Systems, 2020, 7 pages.

Laine et al., "Modular Primitives for High-Performance Differentiable Rendering", ACM Transactions on Graphics, https://doi.org/10.1145/3414685.3417861, vol. 39, No. 6, Article 194, Dec. 2020, pp. 194:1-194:14.
Liu et al., "Soft Rasterizer: A Differentiable Renderer for Image-based 3D Reasoning", IEEE, 2019, pp. 7708-7717.
Hodan et al., "T-LESS: An RGB-D Dataset for 6D Pose Estimation of Texture-less Objects", arXiv:1701.05498, Jan. 19, 2017, 9 pages.
Xiang et al., "PoseCNN: A Convolutional Neural Network for 6D Object Pose Estimation in Cluttered Scenes", arXiv:1711.00199, May 26, 2018, 10 pages.
Lowe, David G, "Object Recognition from Local Scale-Invariant Features", Proc. of the International Conference on Computer Vision, Sep. 1999, pp. 1-8.
Bay et al., "SURF: Speeded Up Robust Features", 2006, pp. 1-14.
Collet et al., "Efficient Multi-View Object Recognition and Full Pose Estimation", 2010, 6 pages.
Collet et al., "The MOPED framework: Object Recognition and Pose Estimation for Manipulation", International Journal of Robotics Research, 2011, pp. 1-22.
Drost et al., "Model Globally, Match Locally: Efficient and Robust 3D Object Recognition", DOI: 10.1109/CVPR.2010.5540108, CVPR, Jul. 2010, 9 pages.
Hinterstoisser et al., "Multimodal Templates for Real-Time Detection of Texture-less Objects in Heavily Cluttered Scenes", IEEE International Conference on Computer Vision, 2011, pp. 858-865.
Jurie et al., "A Simple and Efficient Template Matching Algorithm", International Conference on Computer Vision , Jul. 2001, pp. 544-549.
Rad et al., "BB8: A Scalable, Accurate, Robust to Partial Occlusion Method for Predicting the 3D Poses of Challenging Objects without Using Depth", CVPR, 2017, pp. 3828-3836.
Kehl et al., "SSD-6D: Making RGB-Based 3D Detection and 6D Pose Estimation Great Again", Proceedings of the IEEE International Conference on Computer Vision, 2017, pp. 1521-1529.
Tekin et al., "Real-Time Seamless Single Shot 6D Object Pose Prediction", CVPR, 2018, pp. 292-301.
Peng et al., "PVNet: Pixel-wise Voting Network for 6DoF Pose Estimation", Proceedings of the IEEE/CVF Conference on Computer Vision and Pattern Recognition, 2019, pp. 4561-4570.
Pavlakos et al., "6-DoF Object Pose from Semantic Keypoints", arXiv:1703.04670, Mar. 14, 2017, 8 pages.
Hu et al., "Segmentation-driven 6D Object Pose Estimation", Conference on Computer Vision and Pattern Recognition, 2019, pp. 3385-3394.
Park et al., "Pix2Pose: Pixel-Wise Coordinate Regression of Objects for 6D Pose Estimation", ICCV, 2019, pp. 7668-7677.
Song et al., "HybridPose: 6D Object Pose Estimation under Hybrid Representations", CVPR, 2020, pp. 431-440.
Zakharov et al., "DPOD: 6D Pose Object Detector and Refiner", Proceedings of the IEEE/CVF International Conference on Computer Vision, 2019, pp. 1941-1950.
Haugaard et al., "SurfEmb: Dense and Continuous Correspondence Distributions for Object Pose Estimation with Learnt Surface Embeddings", CVPR, 2022, pp. 6749-6758.
Wang et al., "DenseFusion: 6D Object Pose Estimation by Iterative Dense Fusion", IEEE/CVF Conference on Computer Vision and Pattern Recognition, 2019, pp. 3343-3352.
Lipson et al., "Coupled Iterative Refinement for 6D Multi-Object Pose Estimation", CVPR, 2022, pp. 6728-6737.
Oberweger et al., "Training a Feedback Loop for Hand Pose Estimation", ICCV, 2015, pp. 3316-3324.
Manhardt et al., "Deep Model-Based 6D Pose Refinement in RGB", ECCV, 2018, pp. 1-16.
Ravi et al., "Accelerating 3D Deep Learning with PyTorch3D", arXiv:2007.08501, Jul. 16, 2020, pp. 1-18.
Tsang et al., "Kaolin: A Pytorch Library for Accelerating 3D Deep Learning Research", https://github.com/NVIDIAGameWorks/kaolin, 2022, 6 pages.
Nimier-David et al., "Mitsuba 2: A Retargetable Forward and Inverse Renderer", ACM Trans. Graph., vol. 38, No. 6, Article 203, https://doi.org/10.1145/3355089.3356498, Nov. 2019, pp. 203:1-203:17.

(56)          References Cited

OTHER PUBLICATIONS

Hasselgren et al., "Shape, Light, and Material Decomposition from Images using Monte Carlo Rendering and Denoising", 36th Conference on Neural Information Processing Systems, 2022, pp. 1-14.

Mildenhall et al., "NeRF: Representing Scenes as Neural Radiance Fields for View Synthesis", arXiv:2003.08934, Aug. 3, 2020, pp. 1-25.

Yen-Chen et al., "iNeRF: Inverting Neural Radiance Fields for Pose Estimation", arXiv:2012.05877, Aug. 10, 2021, 9 pages.

Lin et al., "Parallel Inversion of Neural Radiance Fields for Robust Pose Estimation", arXiv:2210.10108, Mar. 10, 2023, 8 pages.

Jang et al., "CodeNeRF: Disentangled Neural Radiance Fields for Object Categories", Proceedings of the IEEE/CVF International Conference on Computer Vision, 2021, pp. 12949-12958.

Levy et al., "MELON: NeRF with Unposed Images in SO(3)", arXiv:2303.08096, Jul. 19, 2023, 18 pages.

Maggio et al., "VERF: Runtime Monitoring of Pose Estimation with Neural Radiance Fields", arXiv:2308.05939, Aug. 11, 2023, 9 pages.

Pan et al., "Learning to Estimate 6DoF Pose from Limited Data: A Few-Shot, Generalizable Approach using RGB Images", arXiv:2306.07598, Jun. 13, 2023, 13 pages.

\* cited by examiner

— 800

| Receive sensor data and 3D model | — 802 |

| Detect object in the sensor data | — 804 |

| Determine initial pose of detected object corresponding to the 3D model | — 806 |

| Optimize initial pose using differential rendering | — 808 |

TECHNIQUES FOR DIFFERENTIABLE DEEP OBJECT POSE ESTIMATION

CROSS-REFERENCE TO RELATED APPLICATIONS

This application claims benefit of the U.S. Provisional Patent Application titled "TECHNIQUES FOR DIFFERENTIABLE DEEP OBJECT POSE ESTIMATION," filed Sep. 27, 2023, and having Ser. No. 63/585,882. The subject matter of this related application is hereby incorporated herein by reference.

BACKGROUND

Field of the Various Embodiments

The various embodiments relate generally to computer science and computer vision and, more specifically, to techniques for differentiable deep object pose estimation.

Description of the Related Art

Object pose estimation is a task in computer vision that involves identifying the position and orientation of an object in a given space. Six degrees of freedom (6-DoF) object pose estimation refers to determining the three position coordinates and three rotation coordinates of an object in 3-dimensional (3D) space. By determining the 6-DoF pose of an object within an environment, a machine can interact with the object in the environment. 6-DoF object pose estimation is used in a wide range of applications including robotic manipulation, augmented/mixed reality, and autonomous navigation.

One conventional approach for estimating the 6-DoF pose of an object (also referred to herein as the "object pose") proceeds in two stages: first, the object pose is roughly estimated, and then the object pose is refined. Typically, the object pose is refined using an iterative technique called render-and-compare. Render-and-compare first renders an image of 3D geometry that represents the object in a current pose. Then, a trained neural network compares the rendered image with a captured image of the object to predict an updated pose that better matches the pose of the object in the captured image. These steps are repeated a number of times to obtain a refined object pose.

One drawback of the above approach is that the refined object pose can be incorrect in some cases. In particular, when the neural network used in render-and-compare is trained on images that are different from the rendered image and/or the captured image, the trained neural network can predict an updated pose that does not improve upon the current pose. As a result, the refined object pose generated by render-and-compare can be incorrect. Further, curating a training dataset that can be used to train the neural network to predict improved poses is oftentimes not straightforward.

As the forgoing illustrates, what is needed in the art are more effective techniques for object pose estimation.

SUMMARY

One embodiment of the present disclosure sets forth a computer-implemented method for determining object poses. The method includes receiving first sensor data and second sensor data, where the first sensor data is associated with a first modality, and the second sensor data is associated with a second modality that is different from the first modality. The method further includes performing one or more first iterative operations to determine a first pose of an object based on one or more comparisons of (i) one or more renderings of a three-dimensional (3D) representation of the object in the first modality with the first sensor data, and (ii) one or more renderings of the 3D representation of the object in the second modality with the second sensor data.

Another embodiment of the present disclosure sets forth a computer-implemented method for determining object poses. The method includes performing one or more first iterative operations to determine a first pose of an object based on one or more comparisons of one or more first renderings of a three-dimensional (3D) representation of the object with sensor data. The method further includes performing one or more second iterative operations to determine a second pose of the object based on one or more comparisons of one or more second renderings of the 3D representation of the object with the sensor data, wherein the one or more first iterative operations and the one or more second iterative operations are performed using at least one of different learning rates or different initial poses of the object. In addition, the method includes selecting one of the first pose or the second pose based on a first loss associated with the first pose and a second loss associated with the second pose.

One technical advantage of the disclosed techniques relative to the prior art is that, with the disclosed techniques, more accurate 6-DoF object poses can be estimated, particularly for complex occluded scenes and textureless and symmetric objects. Another technical advantage of the disclosed techniques is the loss function used during optimization can be tuned for specific scenes, without requiring a neural network to be trained or re-trained. In addition, the disclosed techniques can be used with various types of sensor data, such as RGB (red, green, blue) image data, depth data, intensity edge data, and/or object segmentation data. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be found by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for six degree of freedom (6-DoF) object pose estimation. In some embodiments, a pose estimation application receives as input sensor data that includes one or more images in different modalities, a 3D model of an object, and an initial pose of the object. The images in different modalities can include, e.g., RGB images, depth maps, edge maps, and/or object segmentation masks. The pose estimation application determines the pose of an object in the sensor data and corresponding to the 3D model by (1) computing an initial pose estimate, and (2) refining the initial pose estimate via multiple optimization instances that perform render-and-compare with gradient descent optimization. Render-and-compare is used to minimize the misalignment error of rendered images of the 3D model in the different modalities and the received images in the different modalities. For each optimization instance, gradient descent optimization is used to update the object pose over a number of iterations to minimize the visual error between the rendered images in the different modalities and the received images in the different modalities. Each optimization instance is initiated with a random learning rate or, alternatively, a randomly perturbed initial object pose. When the optimization instances are completed, the pose estimation application selects the object pose from the optimization instances that is associated with a lowest error between the rendered images in the different modalities and the received images in the different modalities.

The object pose estimation techniques of the present disclosure have many real-world applications. For example, the object pose estimation techniques can be used in robotic manipulation, augmented/mixed reality, and autonomous navigation, among other things.

The above examples are not in any way intended to be limiting. As persons skilled in the art will appreciate, as a general matter, the object pose estimation techniques described herein can be implemented in any application where object pose estimates are required or useful.

System Overview

Figure 1:
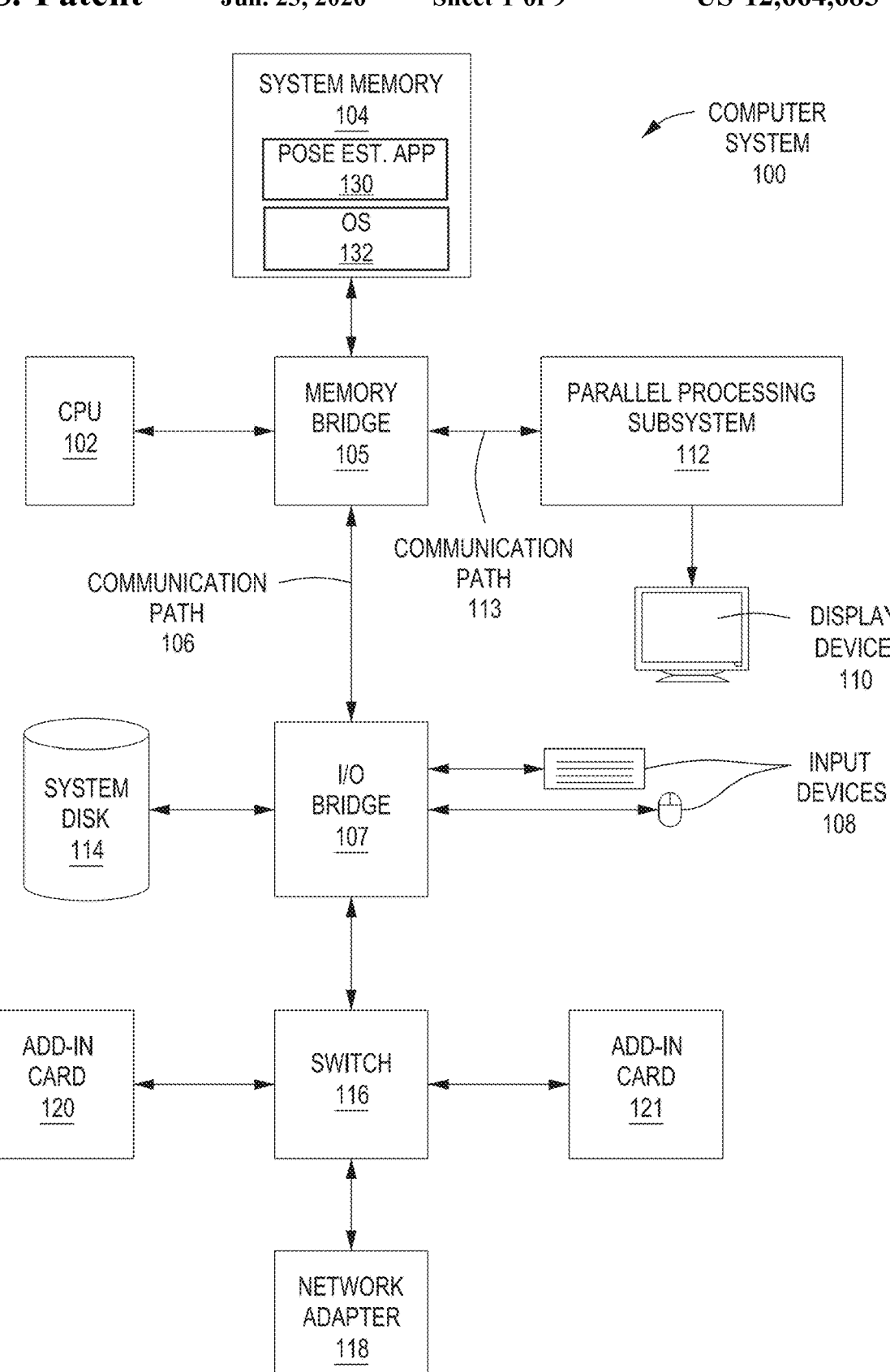
FIG. 1 is a block diagram illustrating a computer system configured to implement one or more aspects of the present embodiments.

FIG. 1 is a block diagram illustrating a computer system 100 configured to implement one or more aspects of the present embodiments. As persons skilled in the art will appreciate, computer system 100 can be any type of technically feasible computer system, including, without limitation, a server machine, a server platform, a desktop machine, laptop machine, a hand-held/mobile device, or a wearable device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via network adapter 130. In one embodiment, switch 116 is configured to provide connections between I/O bridge 107 and other components of computer system 100, such as a network adapter 130 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations.

Illustratively, system memory 104 stores a pose estimation application 130 and an operating system 132 on which pose estimation application 130 runs. The operating system 132 can be, e.g., Linux®, Microsoft Windows®, or macOS®. The pose estimation application 130 can be any technically feasible application that estimates the poses of objects according to techniques disclosed herein. For example, pose estimation application 130 could be a robotic control application, an augmented/mixed reality application, or an autonomous navigation application. Although described herein primarily with respect to rendering application 130 as a reference example, techniques disclosed herein can also be implemented, either entirely or in part, in other software and/or hardware, such as in parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 130 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, parallel processing subsystem 112 may be implemented as a virtualized parallel processing subsystem in some embodiments. For example, parallel processing subsystem 112 could be implemented as a virtual graphics processing unit (GPU) that renders graphics on a virtual machine (VM) executing on a server machine whose GPU and other physical resources are shared across multiple VMs.

Figure 2:
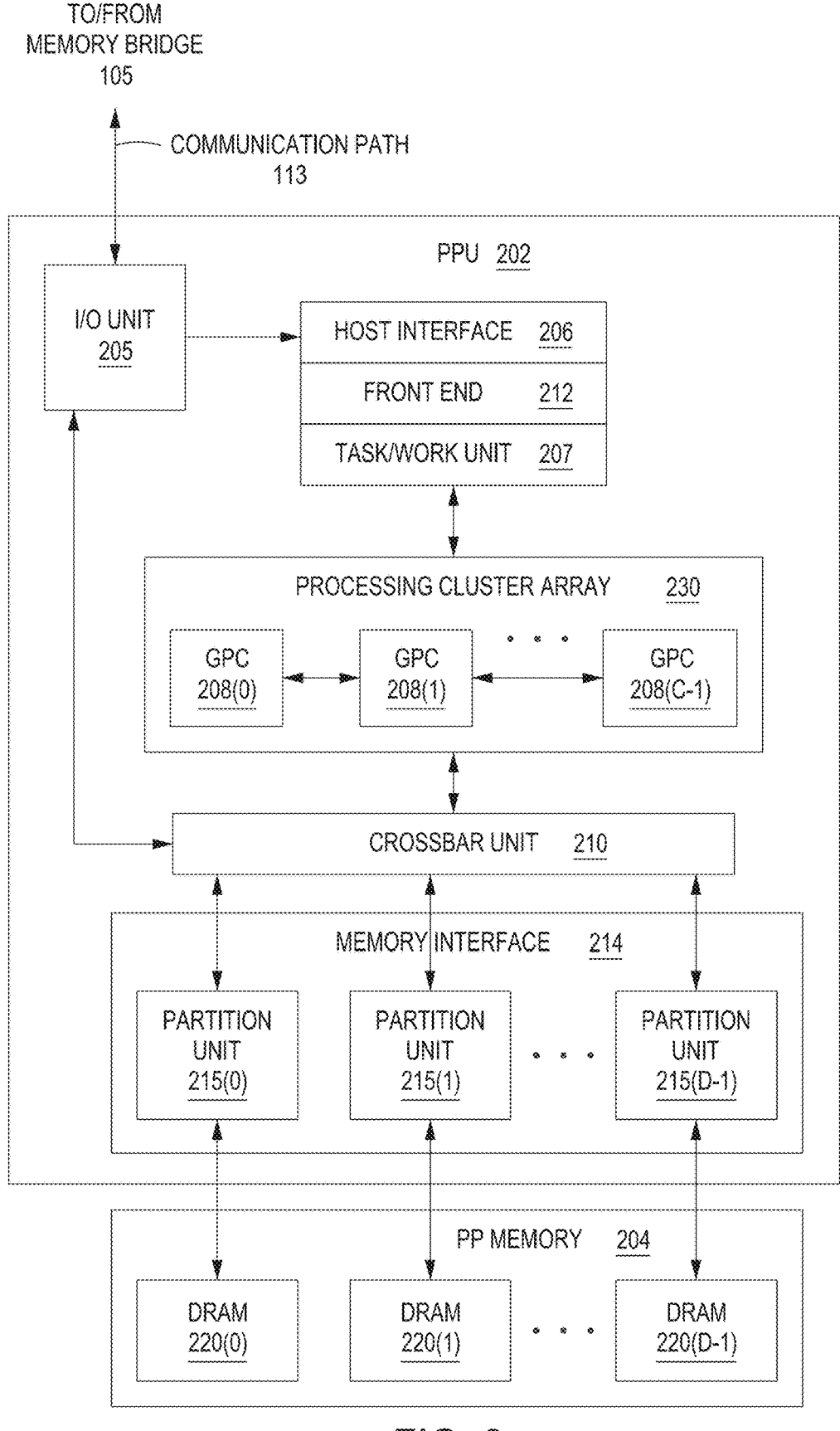
FIG. 2 is a block diagram of a parallel processing unit included in the parallel processing subsystem of FIG. 1, according to various embodiments.

FIG. 2 is a block diagram of a parallel processing unit (PPU) 202 included in parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via network adapter 130.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by front end unit 212 from host interface 206. Processing tasks that may be encoded as TMDs include indices associated with the data to be processed as well as state parameters and commands that define how the data is to be processed. For example, the state parameters and commands could define the program to be executed on the data. Also, for example, the TMD could specify the number and configuration of the set of CTAs. Generally, each TMD corresponds to one task. The task/work unit 207 receives tasks from front end 212 and ensures that GPCs 208 are configured to a valid state before the processing task specified by each one of the TMDs is initiated. A priority may be specified for each TMD that is used to schedule the execution of the processing task. Processing tasks also may be received from processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
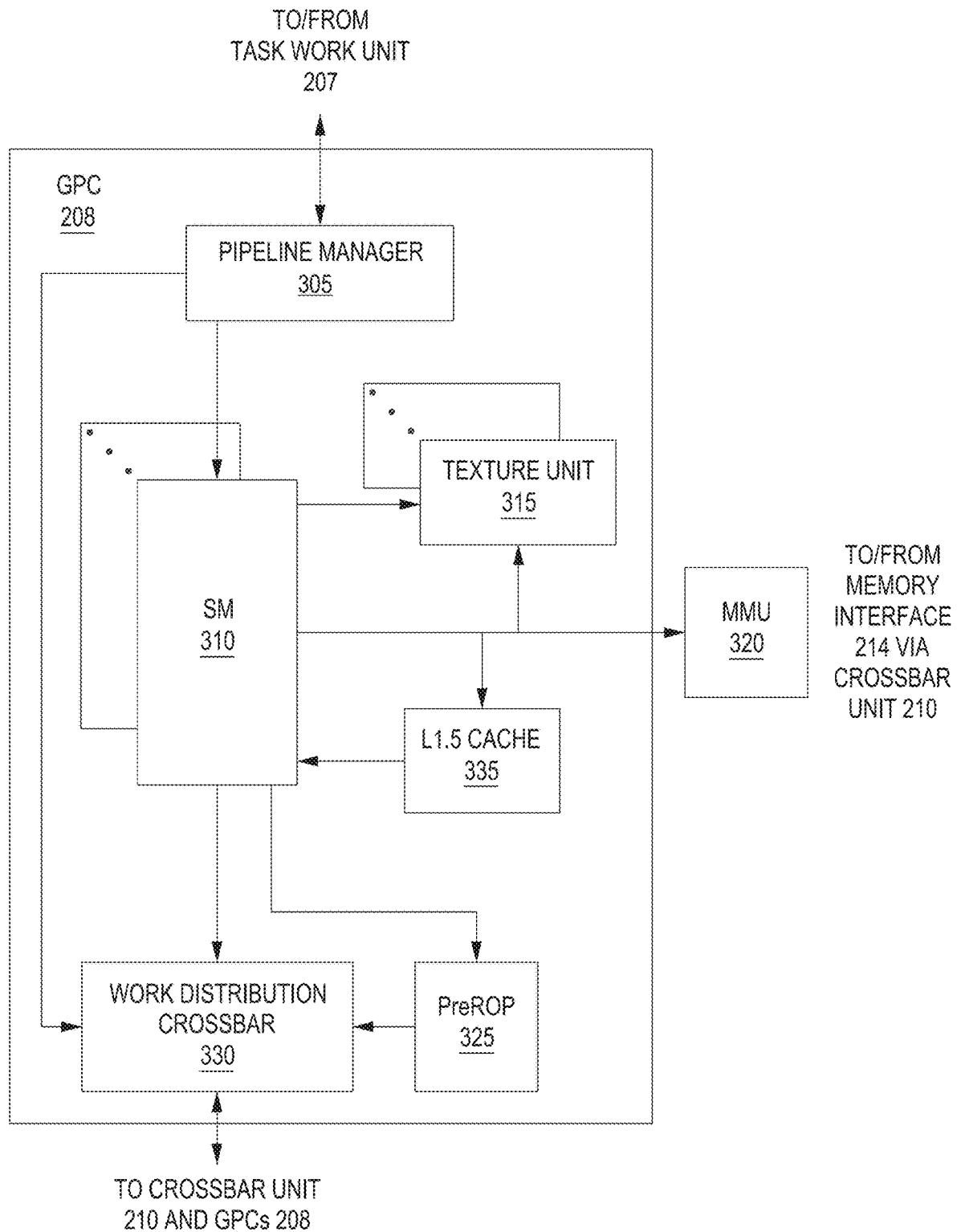
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within SM 310, in which case some of the execution may be idle during cycles when that thread group is being processed. A thread group may also include more threads than the number of execution units within SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within SM 310, and m is the number of thread groups simultaneously active within SM 310. In some embodiments, a single SM 310 may simultaneously support multiple CTAs, where such CTAs are at the granularity at which work is distributed to SMs 310.

In one embodiment, each SM 310 contains a level one (L1) cache or uses space in a corresponding L1 cache outside of SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Differentiable Deep Object Pose Estimation

Figure 4:
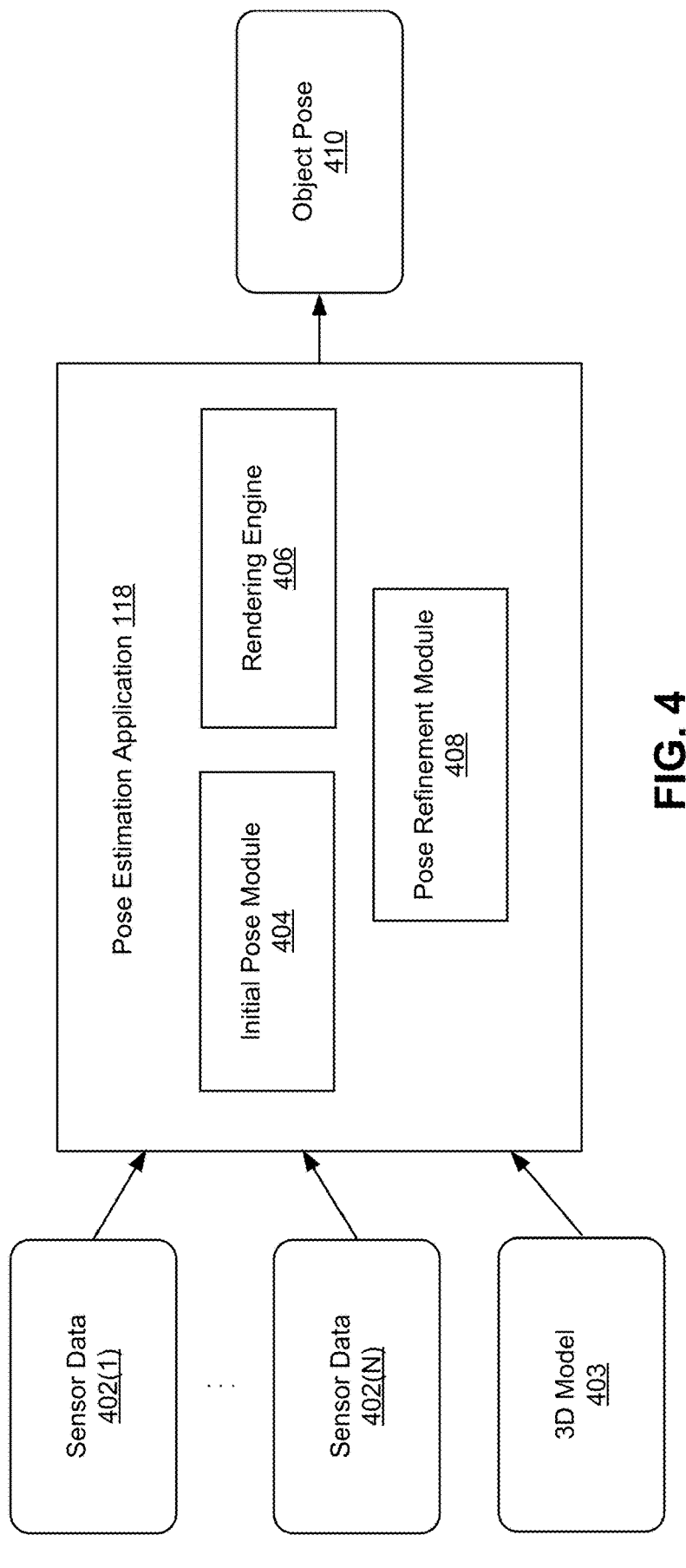
FIG. 4 illustrates in greater detail the pose estimation application of FIG. 1, according to various embodiments.

FIG. 4 illustrates in greater detail the pose estimation application 130 of FIG. 1, according to various embodiments. As shown, pose estimation application 130 includes, without limitation, an initial pose module 404, a rendering engine 406, and a pose refinement module 408. In operation, pose estimation application 130 receives sensor data 402(1)-402(N) (referred to herein collectively as "sensor data 402" and individually as a "sensor data 402") and a 3D model 403 of an object, which can be textured or non-textured, as input. Given such inputs, pose estimation application 130 outputs an object pose 410 with respect to a camera (not shown). Although shown as outputting object pose 410 for illustrative purposes, in some embodiments, pose estimation application 130 can generate any suitable output using the object pose (e.g., a control command for a robot or an autonomous vehicle, a placement of the object within a virtual or augmented reality environment, etc.).

Sensor data 402 can be acquired using, and/or generated from data that is acquired using, one or more sensors. In some embodiments, sensor data 402 can be associated with one or more image modalities (also referred to herein as "modalities"). For example, in some embodiments, the modalities can include RGB (red, green, blue), depth, intensity edge, object segmentation mask, and/or the like. In such cases, sensor data 402 can include RGB image data that is acquired by an RGB camera, depth data that is acquired by a depth sensor (e.g., a LIDAR sensor) or generated from RGB image data, edge data that is generated from RGB image data, object segmentation data that is generated from RGB image data, and/or the like. In some embodiments, sensor data 402 can include various types of image data, such as RGB image(s), depth map(s), edge map(s), segmentation mask(s), etc. An RGB image represents captured image data in red, green and blue color channels. A depth map is an image indicating a depth of each pixel in the image. An edge map is an image that indicates object boundaries, also sometimes referred to as "edges," in the image. A segmentation mask is an image that annotates pixels belonging to object(s) (e.g., using a value of 1) and not belonging to the object(s) (e.g., using a value of 0). Although described herein primarily with respect to the RGB, depth, intensity edge, and object segmentation mask modalities, in some embodiments, any suitable modality or modalities can be used. For example, in some embodiments, sensor data associated with a surface normal modality can be used, either alone or together with sensor data associated with RGB, depth, intensity edge, and/or object segmentation mask modalities.

In some embodiments, a differentiable edge detection technique can be used to generate edge maps that are included in sensor data 402. Edge detection techniques identify object boundaries within an image. In some embodiments, the edge detection technique can identify edges as abrupt changes or transitions in intensity within an RGB image, where there is a significant shift in pixel values, and generate an edge map that indicates the edges. For example, the Sobel, Canny, or Laplacian of Gaussian techniques can be used for edge detection in some embodiments.

In some embodiments, a differentiable depth map extraction technique can be used to generate depth maps that are included in sensor data 402. In such cases, the depth map extraction technique can process an image captured by a camera and/or depth data captured by a depth-sensing device to generate a depth map that indicates a depth of each pixel.

In some embodiments, to improve the accuracy of object pose estimation, pose estimation application 130 receives and processes sensor data associated with multiple modalities (e.g., RGB images, depth maps, edge maps, and object segmentation masks, etc.). In some other embodiments, pose estimation application 130 receives and processes sensor data associated with a single modality (e.g., only RGB images, depth maps, or edge maps).

3D model 403 is a digital representation of an object in 3D. In some embodiments, 3D model 403 can include geometry, texture, and/or other properties such as color, reflectivity, and/or transparency of the object. Although described herein primarily with respect to 3D model 403 as a reference example, any suitable 3D representation that includes geometry and a texture (or no texture) can be used in some embodiments.

Given sensor data 402 and 3D model 403, pose estimation application 130 estimates the pose of an object within sensor data 402 and outputs the estimated pose as object pose 410 (or uses the estimated pose to generate another output). To determine the pose of the object, initial pose module 404 of pose estimation application 130 first locates the object within the scene and estimates an initial 6-DOF pose of the object in 3D space. Then, pose refinement module 408 of pose estimation application 130 refines the initial pose by minimizing the misalignment error of rendered image(s) of a 3D model in different modalit(ies) and image(s) from sensor data 402 in the different modalit(ies).

In operation, initial pose module 404 computes an initial pose (i.e., an initial position and orientation with respect to a camera) of an object in sensor data 402. In some embodiments, initial pose module 404 first localizes an object of interest in sensor data 402. In such cases, any technically feasible object detection technique (e.g., R-CNN or YOLO) can be used to localize an object corresponding to a 3D model. After localizing the object, initial pose module 404 determines an initial pose of the object. Any technically feasible pose estimation technique (e.g., using a trained neural network that outputs an estimated pose) can be used to determine the initial pose. The initial pose can then be input into pose refinement module 408, which refines the initial pose to determine object pose 410.

In operation, pose refinement module 408 minimizes a visual error between sensor data 402 associated with one or more modalities and rendered images of the 3D model representing the object in the one or more modalities, after adjustments are made to a pose of 3D model. The 3D model in the rendered images can be masked using an object segmentation mask, or not masked, in some embodiments. In some embodiments, pose refinement module 408 uses a differentiable rendering engine 406 to update the object pose. Differentiable rendering allows the problem of 6-DoF object pose refinement in equation (1), below, to be solved as a direct end-to-end optimization.

$$T_{CO} = \underset{T'_{CO}}{\arg\min} \text{ loss } (\mathcal{R}(T'_{CO}, M, K), I), \tag{1}$$

where $\mathcal{R}$ is a projected image of the 3D textured model M of a rigid object in a pose $T'_{CO}$ with camera intrinsics K and input image I. $T_{CO}$ is an optimum pose, which can be computed by minimizing equation (1).

Rendering engine 406 can render a reprojected image of a 3D object M in an arbitrary camera pose $T_{CO}$ with camera intrinsics K, as mathematically described in equation (2):

$$\hat{I} \leftarrow \mathcal{R}(T_{CO}M, K). \tag{2}$$

In some embodiments, rendering engine 406 implements a differentiable renderer, such as a Neural Radiance Field (NeRF) renderer. In such cases, because the renderer is differentiable, gradients of a loss function corresponding to the camera pose $T_{CO}$ can be computed through the rendering process, and a solution to equation (1) can be obtained using gradient descent without momentum to minimize a loss function, discussed in greater detail below. Although described herein primarily with respect to gradient descent as a reference example, in some embodiments, any technically feasible optimization technique can be used in lieu of gradient descent. In addition, rendering a 3D model can be non-trivial considering all lighting and material artifacts in a real scene. The flexibility of the differentiable renderer permits incorporating multiple sensor data types, such as depth, edge detection maps, and object segmentation masks in the loss function, which can convey additional information during optimization.

In some embodiments, pose refinement module 408 receives any combination of input sensor data 402 and an initial pose $T_{CO}$ computed by initial pose module 404. Pose refinement module 408 can also receive other parameters, such as a number of optimization iterations, a batch-size B, a low learning rate bound $\ell$, and/or a high learning rate bound h.

Figure 5:
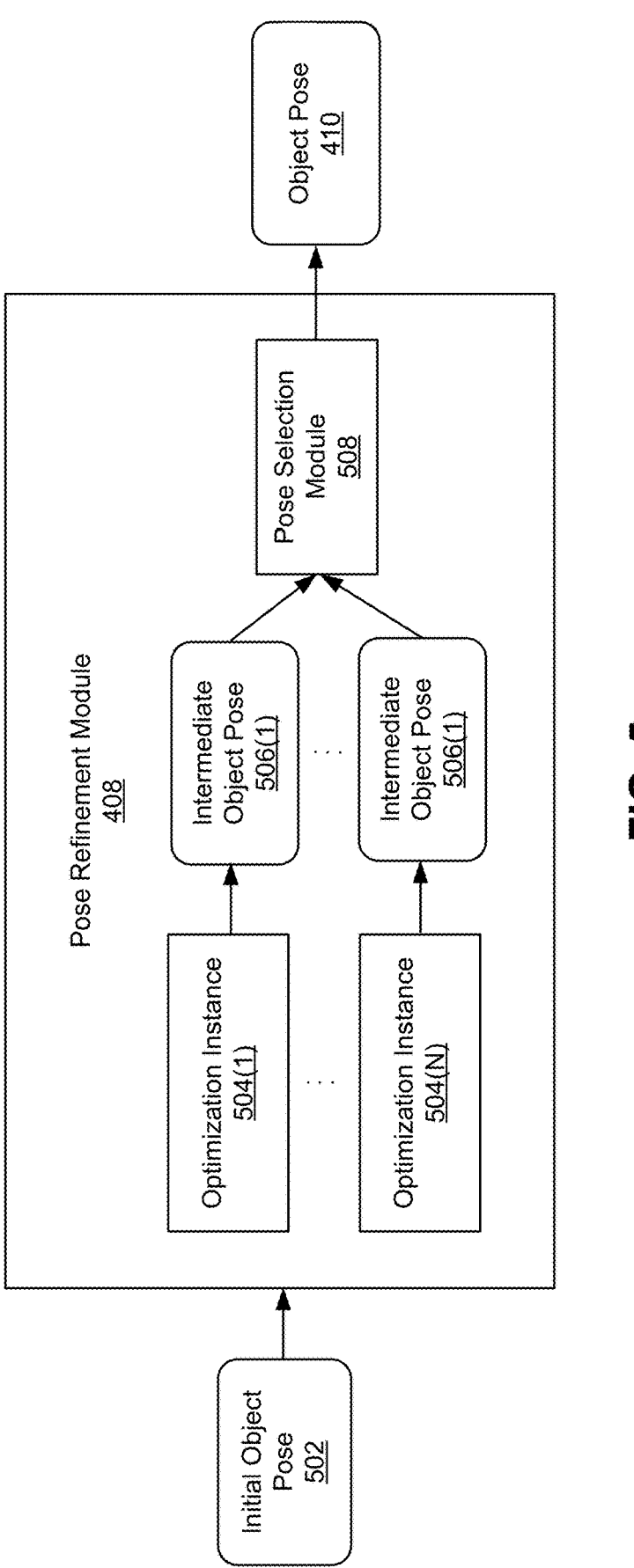
FIG. 5 illustrates in greater detail the pose refinement module of FIG. 4, according to various embodiments.

FIG. 5 illustrates in greater detail pose refinement module 408 of FIG. 4, according to various embodiments. In some embodiments, to prevent getting trapped at local minima (rather than finding a global minimum for equation (1)) in the case of symmetric objects or objects with similar appearances, pose refinement module 408 performs multiple gradient descent optimizations in parallel with different learning rates. As shown in FIG. 5, pose refinement module 408 begins by launching multiple optimization instances 504(1)-504(N) (referred to herein collectively as "optimization instances 504" and individually as an "optimization instance 504"). For each optimization instance 504, pose refinement module 408 selects a different learning rate from a uniform distribution U(l, h). Although described herein primarily with respect to selecting a random learning rate for each optimization instance 504, in some embodiments, pose refinement module 408 can instead randomly perturb the initial object pose for each optimization instance 504. Then, pose refinement module 408 initializes each optimization instance 504 with the input object pose. For each optimization instance 504, pose refinement module 408 applies learning rate decay to ensure convergence and prevent oscillation around a final pose. Further, for each optimization instance 504, pose refinement module 408 uses gradient descent optimization to iteratively minimize a corresponding loss function. In some embodiments, pose refinement module 408 computes the loss function as a weighted combination of terms for different modalities. After all optimization instances have completed, pose refinement module 408 selects, as object pose 410, one of the intermediate object poses 506(1)-506(N) (referred to herein collectively as "intermediate object poses 506" and individually as an "intermediate object pose 506") output by the optimization instances 504 that is associated with a lowest reprojection error.

At each optimization iteration of an optimization instance 504, pose refinement module 408 computes a loss between (1) rendered images in one or more modalities of a 3D object in a current pose; and (2) one or more corresponding images from sensor data 402 associated with the same modalit(ies). In some embodiments, a weighted combination of loss terms can be used. For example, in some embodiments, the following loss function can be used for RGB images, depth maps, and edge maps:

$$\text{loss}\,(\cdot,\,\cdot) = \lambda_c |S \odot (I_c - \mathcal{R}_c(T_{CO}, M, K)|_1 + \tag{3}$$

$$\lambda_d |S \odot (I_d - \mathcal{R}_d(T_{CO}, M, K)|_1 + \lambda_e |S \odot (I_e - \mathcal{R}_e(T_{CO}, M, K)|_1,$$

Equation (3) computes the L1 loss between corresponding input images $I_c$, $I_d$, $I_e$ and rendered images $\hat{I}_* = R_*(.,.,.)$, where $* \in \{c, d, e\}$ for RGB/color (c), depth (d), and edge (e) input images, respectively. Pixelwise multiplication (e.g., Hadamard product, indicated by $\odot$) by the object mask S can be used to limit the loss to relevant regions of the image near or on the object. Weights $\lambda^*$, where $* \in \{c, d, e\}$ for RGB/color (c), depth (d), and edge (e) input images respectively, are used to balance or omit individual loss terms of equation (3). Although described herein primarily with respect to object pose estimation as a reference example, techniques disclosed herein, as well as a loss function similar to the loss function of equation (3), can be used to optimize a 3D representation of an object in any suitable manner, such as optimizing 3D geometry of the 3D representation, optimizing a texture of the 3D representation, optimizing a material property of the 3D representation, and/or optimizing a UV projection of the 3D representation. For example, techniques disclosed herein could be used to refine the appearance of a 3D model to look more similar to an object in an input RGB image.

Figure 6:
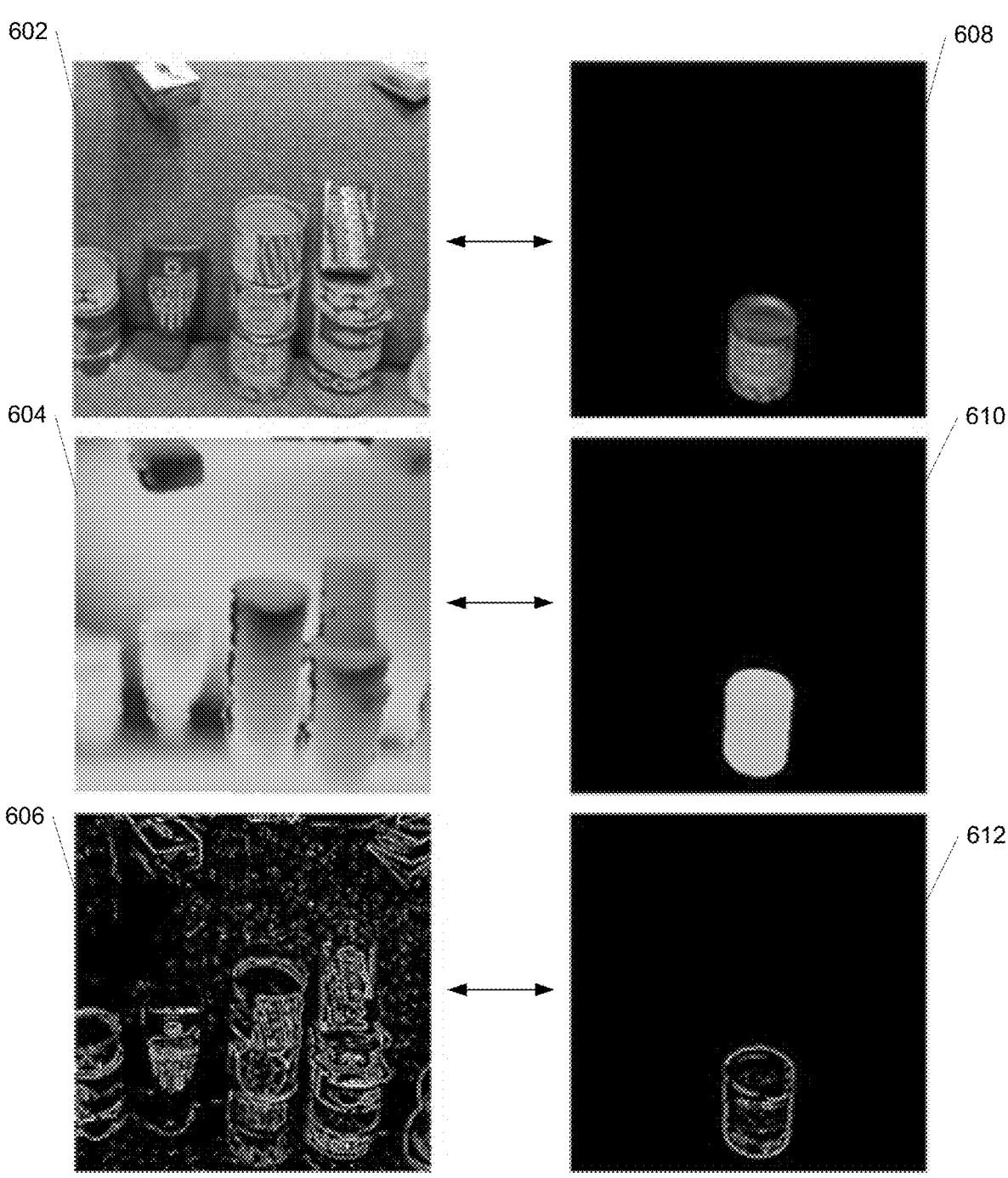
FIG. 6 illustrates exemplar rendered images and target images, according to various embodiments.

FIG. 6 illustrates exemplar rendered images and target images, according to various embodiments. As described, pose estimation application 118 iteratively refines the 6-DoF pose of an object by minimizing the reprojection error between renderings of a 3D model in different modalities and input sensor data associated with the different modalities. As shown in FIG. 6, in some embodiments, an input RGB image 602 is compared with a rendered RGB image 608, an input depth map 604 is compared with a rendered depth map 610, and an input edge map 606 is compared with a rendered edge map 612 in order to compute the reprojection error using the loss function of equation (3) and gradient descent optimization. It should be noted that, although the rendered RGB image 608, the rendered depth map 610, and the rendered edge map 612 include black regions, the comparison of such black regions with corresponding regions of the input RGB image 602, the input depth map 604, and the input edge map 606 will not produce a gradient that affects the gradient descent optimization. For additional robustness, the pose estimation application 118 can perform multiple optimization instances in parallel using randomly sampled initial learning rates. Once the error stabilizes, the object pose from the multiple optimization instances with the lowest reprojection error can be selected.

Figure 7A:
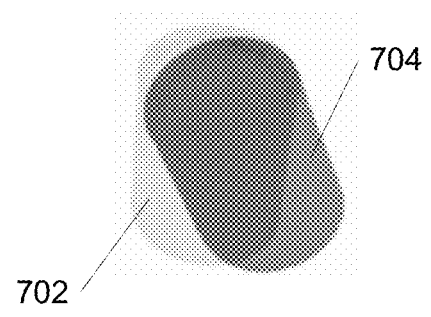
FIG. 7A illustrates an exemplar initial pose estimate for an object, according to various embodiments.

FIG. 7A illustrates an exemplar initial pose estimate for an object, according to various embodiments. As shown, an initial pose estimate 704 for an object differs significantly from a ground truth pose 702 of the object. For example, initial pose estimate 704 could be computed by initial pose module 404 according to techniques described above in conjunction with FIG. 4.

Figure 7B:
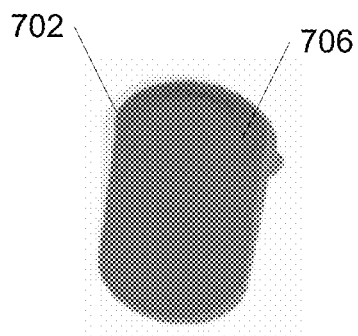
FIG. 7B illustrates an exemplar pose estimate for the object of FIG. 7A, according to the prior art.

FIG. 7B illustrates an exemplar pose estimate for the object of FIG. 7A, according to the prior art. As shown, a pose estimate 706 of the object computed using the Mega-Pose technique, which employs a trained neural network to refine an object pose estimate, also differs from ground truth pose 702 of the object.

Figure 7C:
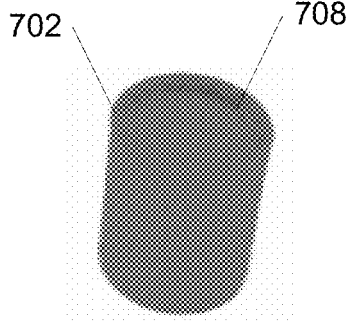
FIG. 7C illustrates an exemplar pose estimate for the object of FIG. 7A, according to various embodiments.

FIG. 7C illustrates an exemplar pose estimate for the object of FIG. 7A, according to various embodiments. As shown, pose estimation application 118 can determine a pose estimate 708 of the object that aligns relatively closely with ground truth pose 702 of the object. Notably, pose estimate 708 is more accurate than pose estimate 706 and initial pose estimate 704.

Figure 8:
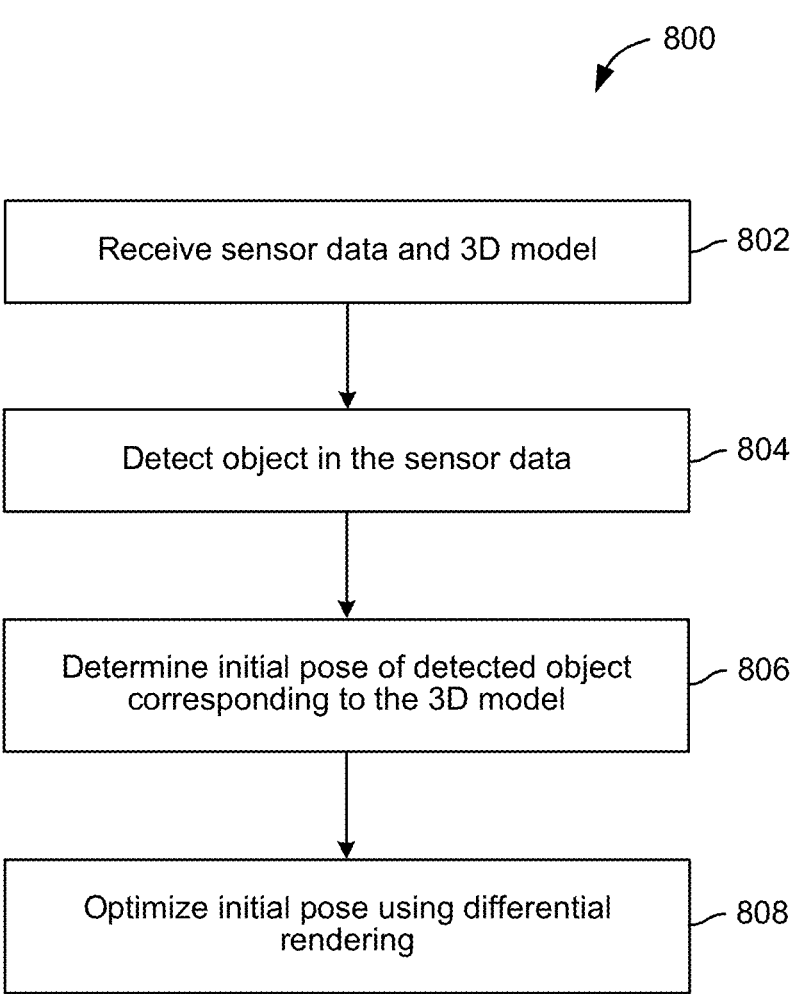
FIG. 8 is a flow diagram of method steps for estimating the pose of an object, according to various embodiments.

FIG. 8 is a flow diagram of method steps for estimating the pose of an object, according to various embodiments.

Although the method steps are described in conjunction with FIGS. 1-5, persons skilled in the art will understand that any system configured to perform the method steps, in any order, falls within the scope of the present disclosure.

As shown, a method 800 begins at step 802, where pose estimation application 130 receives sensor data 402 and 3D model 403 of an object. Sensor data 402 can be acquired using one or more sensors and/or generated from data that is acquired using one or more sensors, as described above in conjunction with FIG. 4. In some embodiments, sensor data 402 can be associated with one or more modalities. For example, in some embodiments, sensor data 402 can include RGB images, depth images, edge maps, and/or object segmentation masks.

At step 804, pose estimation application 130 detects an object in sensor data 402 that corresponds to 3D model 403. In some embodiments, initial pose module 404 of pose estimation application 130 can apply any technically feasible object detection technique to detect the object, and the object detection can be based on various input data, e.g., RGB images, depth maps, edge maps, object segmentation masks, and/or a combination thereof, as described above in conjunction with FIG. 4. Although described with respect to detecting one object for simplicity, pose estimation application 130 can detect any number of objects in some embodiments, and steps 806-808 of method 800 can be repeated to estimate a pose for each of the detected objects.

At step 806, pose estimation application 130 determines an initial pose with respect to a camera of the detected object corresponding to 3D model 403. As described above in conjunction with FIG. 4, initial pose module 404 of pose estimation application 130 can apply any technically feasible pose estimation technique (e.g., using a trained neural network that outputs the initial pose) to determine the initial pose, and the initial pose can then be refined through optimization.

At step 808, pose estimation application 130 optimizes the initial pose using differential rendering. In some embodiments, pose estimation application 130 minimizes the visual error between sensor data associated with one or more modalities and renderings of 3D model 403 in the one or more modalities according to equation (1) after adjusting the object pose. In some embodiments, pose refinement module 408 of pose estimation application 130 computes differentiable gradients of a loss corresponding to the object pose and optimizes the object pose via gradient descent optimization, as discussed in greater detail below in conjunction with FIG. 9.

Figure 9:
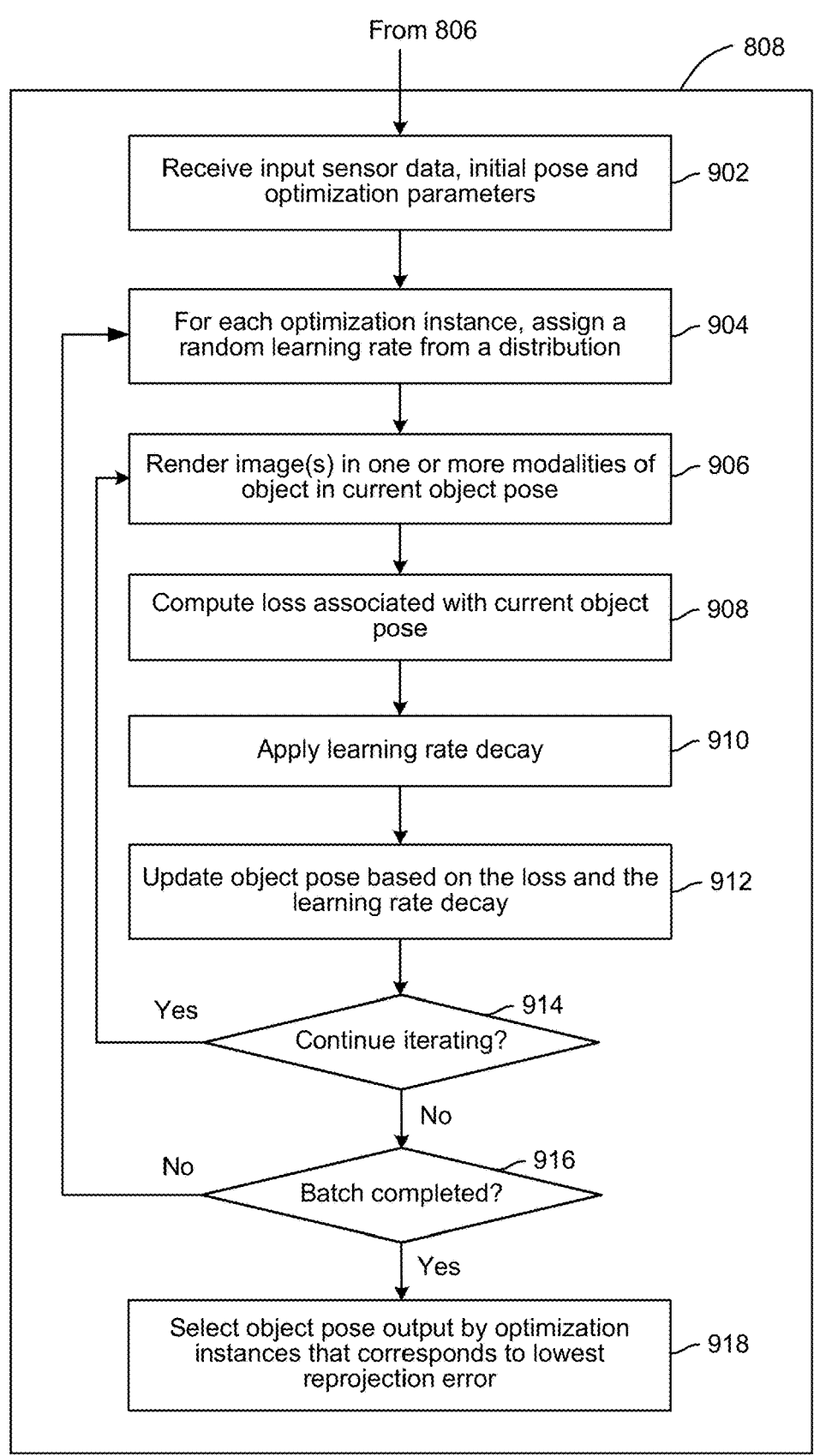
FIG. 9 is a flow diagram of method steps for refining an initial object pose estimate, according to various embodiments.

FIG. 9 is a flow diagram of method steps for refining an initial object pose estimate, according to various embodiments. Although the method steps are described in conjunction with FIGS. 1-5, persons skilled in the art will understand that any system configured to perform the method steps, in any order, falls within the scope of the present disclosure.

As shown, at step 902, pose refinement module 408 receives any combination of input sensor data 402 associated with one or more modalities and an initial pose $T_{CO}$ that was determined at step 806 of method 800.

At step 904, pose refinement module 408 initiates a number of optimization instances and assigns, for each optimization instance, a random learning rate from a distribution. Steps 906-914 are performed for each optimization instance. In some embodiments, pose refinement module 408 performs a batch of gradient descent optimizations in parallel with different learning rates that are randomly selected between a low learning rate bound ℓ and a high learning rate bound h. In such cases, pose refinement module 408 can select a different learning rate from a uniform distribution U(l, h) for each optimization instance, as described above in conjunction with FIG. 4. In some other embodiments, pose refinement module 408 can randomly perturb the initial object pose and use the perturbed object pose as the initialization for each optimization instance, rather than selecting a random learning rate from a distribution for each optimization instance.

At step 906, pose refinement module 408 causes rendering engine 406 to render images in one or more modalities of 3D model 403 in the initial pose. The initial pose is received at step 902, and rendering engine 406 applies, to 3D model 403, a 3D pose transformation corresponding to the initial pose. Then, rendering engine 406 renders images in different modalities (e.g., RGB, depth, edge, segmentation, etc.) of a projection of 3D model 403 in the initial pose.

At step 908, pose refinement module 408 computes a loss associated with the current object pose. In some embodiments, pose refinement module 408 computes the loss using a weighted combination of loss terms representing differences between the rendered images in the one or more modalities and the input sensor data in the one or more modalities (e.g., differences between rendered RGB images and received RGB images, etc.), as described above in conjunction with FIGS. 4-5.

At step 910, pose refinement module 408 applies a learning rate decay. The learning rate decay helps ensure convergence and prevent oscillation around the final pose.

At step 912, pose refinement module 408 updates the object pose based on the computed loss and the learning rate decay value. In some embodiments, pose refinement module 408 can update the object pose by changing values within a transformation matrix associated with the object pose using gradients of the loss computed at step 908 and a gradient descent technique. Although described herein primarily with respect to gradient descent, any technically feasible optimization technique can be used in some embodiments.

At step 914, pose refinement module 408 determines whether to continue iterating. In some embodiments, pose refinement module 408 determines whether a predefined number of iterations has been reached, in which case method 800 continues to step 916. In such cases, the predefined number of iterations can be received as one of the optimization parameters at step 902. On the other hand, if the predefined number of iterations has not been reached, method 800 returns to step 906, where pose refinement module 408 again renders image(s) in one or more modalities of the object in the current object pose.

At step 916, pose refinement module 408 determines whether all optimizations in the batch are completed. If pose refinement module 408 determines that not all optimizations in the batch are completed, method 800 returns to step 904, where pose refinement module assigns a random learning rate to one or more additional optimization instances. In some embodiments, the number of optimizations in the batch is included in the optimization parameters received at step 902.

On the other hand, if pose refinement module 408 determines that all optimizations are completed, then method 800 continues to step 918, where pose refinement module 408 selects the object pose output by the optimization instances that is associated with a lowest reprojection error. In some embodiments, pose refinement module 408 compares the losses associated with the object pose output by the optimization instances and selects the object pose associated with the lowest loss value.

In sum, techniques are disclosed for 6-DoF object pose estimation. In some embodiments, a pose estimation application receives as input sensor data that includes one or more images in different modalities, a 3D model of an object, and an initial pose of the object. The images in different modalities can include, e.g., RGB images, depth maps, edge maps, and/or object segmentation masks. The pose estimation application determines the pose of an object in the sensor data and corresponding to the 3D model by (1) computing an initial pose estimate, and (2) refining the initial pose estimate via multiple optimization instances that perform render-and-compare with gradient descent optimization. Render-and-compare is used to minimize the misalignment error of rendered images of the 3D model in the different modalities and the received images in the different modalities. For each optimization instance, gradient descent optimization is used to update the object pose over a number of iterations to minimize the visual error between the rendered images in the different modalities and the received images in the different modalities. Each optimization instance is initiated with a random learning rate or, alternatively, a randomly perturbed initial object pose. When the optimization instances are completed, the pose estimation application selects the object pose from the optimization instances that is associated with a lowest error between the rendered images in the different modalities and the received images in the different modalities.

One technical advantage of the disclosed techniques relative to the prior art is that, with the disclosed techniques, more accurate 6-DoF object poses can be estimated, particularly for complex occluded scenes and textureless and symmetric objects. Another technical advantage of the disclosed techniques is the loss function used during optimization can be tuned for specific scenes, without requiring a neural network to be trained or re-trained. In addition, the disclosed techniques can be used with various types of sensor data, such as RGB (red, green, blue) image data, depth data, intensity edge data, and/or object segmentation data. These technical advantages provide one or more technological improvements over prior art approaches.

1. In some embodiments, a computer-implemented method for determining object poses comprises receiving first sensor data and second sensor data, wherein the first sensor data is associated with a first modality, and the second sensor data is associated with a second modality that is different from the first modality, and performing one or more first iterative operations to determine a first pose of an object based on one or more comparisons of (i) one or more renderings of a three-dimensional (3D) representation of the object in the first modality with the first sensor data, and (ii) one or more renderings of the 3D representation of the object in the second modality with the second sensor data.

2. The computer-implemented method of clause 1, wherein the first pose is associated with a first loss, and the method further comprises performing one or more second iterative operations to determine a second pose of the object within the scene based on one or more comparisons of (i) one or more additional renderings of the 3D representation of the object in the first modality with the first sensor data, and (ii) one or more additional renderings of the 3D representation of the object in the second modality with the second sensor data, wherein the second pose is associated with a second loss, and selecting one of the first pose or the second pose based on the first loss and the second loss.

3. The computer-implemented method of clauses 1 or 2, wherein the one or more first iterative operations are performed in parallel with the one or more second iterative operations.

4. The computer-implemented method of any of clauses 1-3, wherein the one or more first iterative operations are performed using a first learning rate, and the one or more second iterative operations are performed using a second learning rate.

5. The computer-implemented method of any of clauses 1-4, wherein the one or more first iterative operations are performed beginning from a first initial pose of the object, and the one or more second iterative operations are performed beginning from a second initial pose of the object.

6. The computer-implemented method of any of clauses 1-5, wherein the one or more first iterative operations include one or more gradient descent operations.

7. The computer-implemented method of any of clauses 1-6, wherein each of the first modality and the second modality is one of a RGB (red, green, blue) modality, a depth modality, an edge modality, a surface normal modality, or an object segmentation mask modality.

8. The computer-implemented method of any of clauses 1-7, further comprising performing one or more operations to detect the object within the first sensor data, and determining an initial pose of the object based on the first sensor data, wherein the one or more first iterative operations begin from the initial pose of the object.

9. The computer-implemented method of any of clauses 1-8, wherein the one or more first iterative operations further determine at least one of a geometry of the 3D representation, a texture of the 3D representation, a material property of the 3D representation, or a UV projection of the 3D representation.

10. The computer-implemented method of any of clauses 1-9, wherein the second sensor data is generated based on the first sensor data.

11. In some embodiments, one or more non-transitory computer-readable media store program instructions that, when executed by at least one processor, cause the at least one processor to perform the steps of receiving first sensor data and second sensor data, wherein the first sensor data is associated with a first modality, and the second sensor data is associated with a second modality that is different from the first modality, and performing one or more first iterative operations to determine a first pose of an object based on one or more comparisons of (i) one or more renderings of a three-dimensional (3D) representation of the object in the first modality with the first sensor data, and (ii) one or more renderings of the 3D representation of the object in the second modality with the second sensor data.

12. The one or more non-transitory computer-readable media of clause 11, wherein the first pose is associated with a first loss, and the instructions, when executed by the at least one processor, further cause the at least one processor to perform the steps of performing one or more second iterative operations to determine a second pose of the object within the scene based on one or more comparisons of (i) one or more additional renderings of the 3D representation of the object in the first modality with the first sensor data, and (ii) one or more additional renderings of the 3D representation of the object in the second modality with the second sensor data, wherein the second pose is associated with a second loss, and selecting one of the first pose or the second pose based on the first loss and the second loss.

13. The one or more non-transitory computer-readable media of clauses 11 or 12, wherein the one or more first iterative operations are performed using a first learning rate, and the one or more second iterative operations are performed using a second learning rate.

14. The one or more non-transitory computer-readable media of any of clauses 11-13, wherein the one or more first iterative operations include one or more gradient descent operations.

15. The one or more non-transitory computer-readable media of any of clauses 11-14, wherein each of the first modality and the second modality is one of a RGB (red, green, blue) modality, a depth modality, an edge modality, a surface normal modality, or an object segmentation mask modality.

16. The one or more non-transitory computer-readable media of any of clauses 11-15, wherein the instructions, when executed by the at least one processor, further cause the at least one processor to perform the steps of performing one or more operations to detect the object within the first sensor data via a trained machine learning model, and determining an initial pose of the object based on the first sensor data, wherein the one or more first iterative operations begin from the initial pose of the object.

17. The one or more non-transitory computer-readable media of any of clauses 11-16, wherein the instructions, when executed by the at least one processor, further cause the at least one processor to perform the step of at least one of performing one or more operations to control a robot, performing one or more operations to control an autonomous vehicle, or rendering an image based on the first pose of the object.

18. In some embodiments, a computer-implemented method for determining object poses comprises performing one or more first iterative operations to determine a first pose of an object based on one or more comparisons of one or more first renderings of a three-dimensional (3D) representation of the object with sensor data, performing one or more second iterative operations to determine a second pose of the object based on one or more comparisons of one or more second renderings of the 3D representation of the object with the sensor data, wherein the one or more first iterative operations and the one or more second iterative operations are performed using at least one of different learning rates or different initial poses of the object, and selecting one of the first pose or the second pose based on a first loss associated with the first pose and a second loss associated with the second pose.

19. The computer-implemented method of clause 18, wherein the one or more first iterative operations are performed in parallel with the one or more second iterative operations, and each of the one or more first iterative operations and the one or more second iterative operations include one or more gradient descent operations 20. The computer-implemented method of clauses 18 or 19, wherein the sensor data includes data associated with a plurality of modalities, and the plurality of modalities includes at least one of a RGB (red, green, blue) modality, a depth modality, an edge modality, a surface normal modality, or an object segmentation mask modality.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for determining object poses, the method comprising:

performing one or more first iterative operations to determine a first pose of an object based on one or more comparisons of one or more first renderings of a three-dimensional (3D) representation of the object with sensor data;

performing one or more second iterative operations to determine a second pose of the object based on one or more comparisons of one or more second renderings of the 3D representation of the object with the sensor data, wherein the one or more first iterative operations and the one or more second iterative operations are performed using at least one of different learning rates or different initial poses of the object; and selecting one of the first pose or the second pose based on a first loss associated with the first pose and a second loss associated with the second pose.

2. The computer-implemented method of claim 1, wherein the one or more first iterative operations are performed in parallel with the one or more second iterative operations, and each of the one or more first iterative operations and the one or more second iterative operations include one or more gradient descent operations.

3. The computer-implemented method of claim 1, wherein the sensor data includes data associated with a plurality of modalities, and the plurality of modalities includes at least one of a RGB (red, green, blue) modality, a depth modality, an edge modality, a surface normal modality, or an object segmentation mask modality.

4. One or more non-transitory computer-readable media storing program instructions that, when executed by at least one processor, cause the at least one processor to perform the steps of:

receiving first sensor data and second sensor data, wherein the first sensor data is associated with a first modality, and the second sensor data is associated with a second modality that is different from the first modality; and performing a plurality of first iterative operations to determine a first pose of an object by performing, at each iteration of the plurality of first iterative operations, comparisons of (i) a candidate rendering of a three-dimensional (3D) representation of the object in the first modality with the first sensor data, and (ii) a candidate rendering of the 3D representation of the object in the second modality with the second sensor data.

5. The one or more non-transitory computer-readable media of claim 4, wherein the first pose is associated with a first loss, and the instructions, when executed by the at least one processor, further cause the at least one processor to perform the steps of:

performing one or more second iterative operations to determine a second pose of the object based on one or more comparisons of (i) one or more additional renderings of the 3D representation of the object in the first modality with the first sensor data, and (ii) one or more additional renderings of the 3D representation of the object in the second modality with the second sensor data, wherein the second pose is associated with a second loss; and selecting one of the first pose or the second pose based on the first loss and the second loss.

6. The one or more non-transitory computer-readable media of claim 5, wherein the plurality of first iterative operations is performed using a first learning rate, and the one or more second iterative operations are performed using a second learning rate.

7. The one or more non-transitory computer-readable media of claim 4, wherein the plurality of first iterative operations includes one or more gradient descent operations.

8. The one or more non-transitory computer-readable media of claim 4, wherein each of the first modality and the second modality is one of a RGB (red, green, blue) modality, a depth modality, an edge modality, a surface normal modality, or an object segmentation mask modality.

9. The one or more non-transitory computer-readable media of claim 4, wherein the instructions, when executed by the at least one processor, further cause the at least one processor to perform the steps of:

performing one or more operations to detect the object within the first sensor data via a trained machine learning model; and determining an initial pose of the object based on the first sensor data, wherein the plurality of first iterative operations begins from the initial pose of the object.

10. The one or more non-transitory computer-readable media of claim 4, wherein the instructions, when executed by the at least one processor, further cause the at least one processor to perform the step of at least one of performing one or more operations to control a robot, performing one or more operations to control an autonomous vehicle, or rendering an image based on the first pose of the object.

11. A computer-implemented method for determining object poses, the method comprising:

receiving first sensor data and second sensor data, wherein the first sensor data is associated with a first modality, and the second sensor data is associated with a second modality that is different from the first modality; and performing a plurality of first iterative operations to determine a first pose of an object by performing, at each iteration of the plurality of first iterative operations, comparisons of (i) a candidate rendering of a three-dimensional (3D) representation of the object in the first modality with the first sensor data, and (ii) a candidate rendering of the 3D representation of the object in the second modality with the second sensor data.

12. The computer-implemented method of claim 11, wherein the first pose is associated with a first loss, and the method further comprises:

performing one or more second iterative operations to determine a second pose of the object based on one or more comparisons of (i) one or more additional renderings of the 3D representation of the object in the first modality with the first sensor data, and (ii) one or more additional renderings of the 3D representation of the object in the second modality with the second sensor data, wherein the second pose is associated with a second loss; and selecting one of the first pose or the second pose based on the first loss and the second loss.

13. The computer-implemented method of claim 12, wherein the plurality of first iterative operations is performed in parallel with the one or more second iterative operations.

14. The computer-implemented method of claim 12, wherein the plurality of first iterative operations is performed using a first learning rate, and the one or more second iterative operations are performed using a second learning rate.

15. The computer-implemented method of claim 12, wherein the plurality of first iterative operations is performed beginning from a first initial pose of the object, and the one or more second iterative operations are performed beginning from a second initial pose of the object.

16. The computer-implemented method of claim 11, wherein the plurality of first iterative operations includes one or more gradient descent operations.

17. The computer-implemented method of claim 11, wherein each of the first modality and the second modality is one of a RGB (red, green, blue) modality, a depth modality, an edge modality, a surface normal modality, or an object segmentation mask modality.

18. The computer-implemented method of claim 11, further comprising:

performing one or more operations to detect the object within the first sensor data; and determining an initial pose of the object based on the first sensor data, wherein the plurality of first iterative operations begins from the initial pose of the object.

19. The computer-implemented method of claim 11, wherein the plurality of first iterative operations further determine at least one of a geometry of the 3D representation, a texture of the 3D representation, a material property of the 3D representation, or a UV projection of the 3D representation.

20. The computer-implemented method of claim 11, wherein the second sensor data is generated based on the first sensor data.

* * * * *